United States Patent
Cohen et al.

(10) Patent No.: US 8,433,187 B2
(45) Date of Patent: Apr. 30, 2013

(54) DISTANCE ESTIMATION SYSTEMS AND METHOD BASED ON A TWO-STATE AUTO-FOCUS LENS

(75) Inventors: Noy Cohen, Tel-Aviv (IL); Gal Shabtay, Tel-Aviv (IL)

(73) Assignee: DigitalOptics Corporation MEMS, Arcadia, CA (US)

( * ) Notice: Subject to any disclaimer, the term of this patent is extended or adjusted under 35 U.S.C. 154(b) by 191 days.

(21) Appl. No.: 13/008,254

(22) Filed: Jan. 18, 2011

(65) Prior Publication Data

US 2012/0182448 A1    Jul. 19, 2012

(51) Int. Cl.
*G03B 13/36* (2006.01)
*G01C 3/08* (2006.01)

(52) U.S. Cl.
USPC ............................ 396/125; 396/133; 356/4.01

(58) Field of Classification Search .............. 396/73–75, 396/89, 125, 133; 356/4.01; 348/345
See application file for complete search history.

(56) References Cited

U.S. PATENT DOCUMENTS

| | | | |
|---|---|---|---|
| 7,477,400 B2 | 1/2009 | Gutierrez et al. | |
| 7,577,351 B2 * | 8/2009 | Pollard | 396/125 |
| 7,697,831 B1 * | 4/2010 | Tsai et al. | 396/125 |
| 2007/0036427 A1 * | 2/2007 | Nakamura et al. | 382/154 |
| 2007/0040924 A1 * | 2/2007 | Cho et al. | 348/335 |
| 2008/0043217 A1 * | 2/2008 | Lundgren et al. | 356/4.03 |
| 2008/0297648 A1 * | 12/2008 | Furuki et al. | 348/345 |
| 2012/0182448 A1 * | 7/2012 | Cohen et al. | 348/231.99 |

* cited by examiner

*Primary Examiner* — W. B. Perkey
(74) *Attorney, Agent, or Firm* — Haynes and Boone, LLP

(57) ABSTRACT

An electronic device including a camera adapted to capture images is provided. The camera includes a lens having a first focusing state and a second focusing state; an image sensor adapted to capture a first image of an object in the first focusing state and a second image of the object in the second focusing state. The electronic device further includes a memory configured to store instructions; and a processor coupled to the memory and the camera, wherein the processor is adapted to determine a distance to the object based on the first image and the second image. A lens system including an actuator to modify a configuration of the lens system is also provided, having a first and second focusing state; a memory; and a lookup table to estimate a distance from the lens system to an object.

23 Claims, 13 Drawing Sheets

DISTANCE ESTIMATION SYSTEMS AND METHOD BASED ON A TWO-STATE AUTO-FOCUS LENS

TECHNICAL FIELD

One or more embodiments of the invention relate generally to electronic appliances including cameras and, more particularly, to systems and methods used for distance estimation of objects.

BACKGROUND

Distance estimation is of relevance for several applications involving electronic appliances having optics systems and cameras. Some applications may need to determine an object distance to correct for axial chromatic aberration in the image obtained by the camera. In other applications of electronic appliances, distance estimation may be used for surveillance purposes and/or may be useful for safety control mechanisms, to ensure that appropriate safety measures are satisfied.

Current approaches to distance estimation for optics systems and cameras make use of active methods involving intensive adjustment of the optics system. In current approaches to active methods, an optics system configuration is continuously modified while an image is captured and a "sharpness" metric is obtained. A feedback mechanism usually provides information to a mechanical actuator to scan for a configuration that maximizes the sharpness metric selected. In such systems, the configuration of the optical system is usually adjusted until the sharpest point is obtained. The appliance then evaluates the object distance by using a processor to retrieve the object distance from a pre-selected through-focus sharpness graph.

One of the drawbacks of using this approach is the distraction to the sharpness metric introduced by the presence of physical objects between the object of interest and the camera. For example, a glass or a tree may create complicating features for the sharpness metric.

Another drawback of current active systems is that normally a continuous scan of optical system configurations is necessary, adding stringent requirements to a mechanical actuator. In some instances, a feedback mechanism is necessary to couple the mechanical actuator to a metric optimization. This may add an extra design requirement for the electronics included in the appliance. Furthermore, the time it takes to find an object distance by continuously scanning for an optimal configuration may be excessive. This may be especially burdensome for integrated systems where finding the object distance may be only one task in a series of more complex operations.

As a result, there is a need for an electronic appliance that performs distance estimation accurately and with few mechanical requirements that can be flexibly adapted to more complex systems.

SUMMARY

In accordance with an embodiment of the invention, an electronic device includes a camera adapted to capture images, the camera includes a lens having a first focusing state and a second focusing state; an image sensor adapted to capture a first image of an object in the first focusing state and a second image of the object in the second focusing state; a memory configured to store instructions; and a processor coupled to the memory and the camera, wherein the processor, based on the instructions, is adapted to determine a distance to the object based on the first image and the second image.

In accordance with another embodiment of the invention, a lens system includes an actuator adapted to modify a configuration of the lens system; a first configuration having a first focusing state; a second configuration having a second focusing state; a memory; and a lookup table stored in the memory, wherein the lookup table provides information to estimate a distance from the lens system to an object disposed within a distance range between the first and second focusing states based on image data of the object obtained at the first and second focusing states.

In accordance with another embodiment of the invention, a method includes capturing a first image of an object at a first distance using a first focusing state of a lens within a camera; determining a first metric value for the first image; capturing a second image of the object at approximately the first distance using a second focusing state of the lens; determining a second metric value for the second image; and calculating a distance estimate between the camera and the object, for the first distance, based on calibration data and the first and second metric values.

In accordance with another embodiment of the invention, a method includes providing a lens system having a first focusing state for an object at a first distance and a second focusing state for the object at a second distance; providing a camera to capture images of the object with the lens system; selecting a plurality of distances with values between the first distance and the second distance; capturing with the camera a first image of the object at each one of the plurality of distances using the lens system in the first focusing state; determining a first metric value for the first image of the object at each one of the plurality of distances; capturing with the camera a second image of the object at each one of the plurality of distances using the lens system in the second focusing state; determining a second metric value for the second image of the object at each one of the plurality of distances; and generating a distance estimate relationship to provide calibration data for the plurality of distances based on the object distance and values obtained from the first metric value determined at the object distance and the second metric value determined at the object distance for each one of the plurality of distances.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems and methods are disclosed herein to provide an electronic appliance (e.g., a camera or any other type of electronic device, such as a cell phone, that includes a camera) to capture object images in accordance with one or more embodiments. The electronic appliance may further determine object distances. For distance estimation with optical systems, some embodiments may use methods wherein measurements are collected using a discrete number of configurations. In such embodiments, the optics system may be adjusted in pre-determined configurations irrespective of the specific distance to the object of interest. Thus, a continuous adjustment of the optical system while some parameter is optimized may be avoided. A metric value may be obtained for the different configurations of the optics system without need for further adjustment of the optics system. A determination may be made of the object distance using the metric values obtained for pre-determined optical system configurations.

A method for object determination as disclosed in embodiments herein may be advantageous for electronic appliances that may be adapted to an Image Signal Processing (ISP) chain. Methods using a discrete number of configurations provide flexibility for placing an electronic appliance according to embodiments disclosed herein as a block, within the ISP chain.

In general, many applications may benefit from an electronic appliance having the capability to obtain distance information. For example, such an electronic appliance may be used to improve distortion correction and image quality in imaging systems or be used for scene analysis and related applications. As another example, digital image effects may be introduced, such as artistic blur ("bokeh"), and related techniques may be used. As further examples, an electronic appliance and methods for its use as disclosed herein may be employed for gesture recognition (e.g., human gestures such as body motion of hand or face) or to render a 3D modeling of objects captured in an image, which may require using the relative distances of portions of the object.

Figure 1:
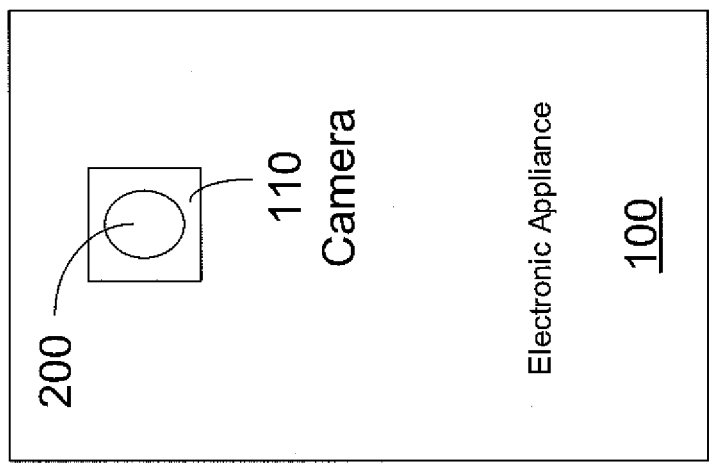
FIG. 1 shows a block diagram illustrating an electronic appliance in accordance with an embodiment of the invention.

FIG. 1 shows a block diagram illustrating electronic appliance 100 in accordance with an embodiment of the invention. Appliance 100 may include a camera 110 having an optics system 200. Optics system 200 may include a lens or a plurality of lenses arranged along an optical axis. Optics system 200 may further include prisms, mirrors, and other optical elements such as found in optical imaging systems. For example, optics system 200 may include a shutter and an aperture to allow optical rays to enter into optical system 200.

Figure 2:
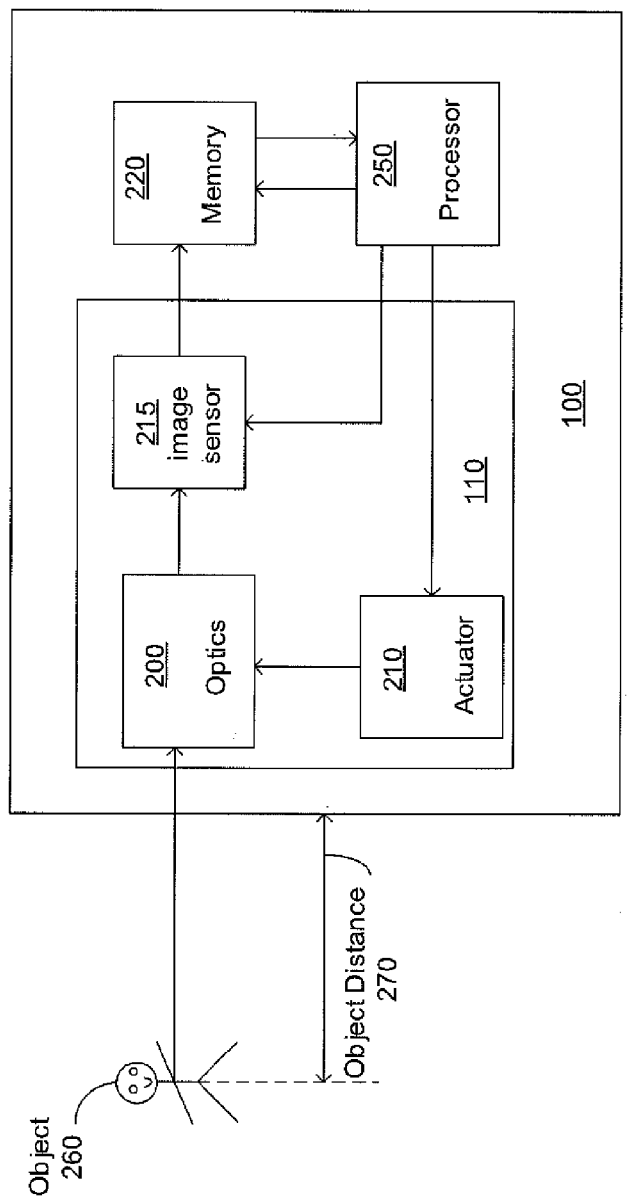
FIG. 2 shows an electronic appliance as in FIG. 1 including an object placed at a distance, optics, an actuator, an image sensor, a memory circuit and a processor circuit, according to some embodiments.

FIG. 2 shows a block diagram of an example implementation of electronic appliance 100 (FIG. 1) and an object 260 placed at a distance 270. Appliance 100 may include for one or more embodiments a camera 110 having an optics system 200, an actuator 210, and an image sensor 215. In some embodiments appliance 100 may also include a memory circuit 220 and a processor circuit 250, which may or may not form part of camera 110 according to some embodiments.

Optics system 200 captures optical rays coming from object 260, and forms an image that is projected onto image sensor 215. Sensor 215 may be a charged-coupled device (CCD) array, or a CMOS pixel array that electronically captures optical information in the form of an array of pixels. The information may be captured as digital data, and the pixel array may have different configurations. For example, in some embodiments the pixel array is a one-dimensional (1D) pixel array; other embodiments may include a two-dimensional (2D) pixel array. The digital data electronically produced by sensor 215 may be stored in memory circuit 220. Processor circuit 250 controls the operation of image sensor 215 and has direct access to memory circuit 220. Processor 250 also controls actuator 210.

According to some embodiments consistent with FIG. 2, actuator 210 may include mechanical components that alter the configuration of optics system 200. For example, some embodiments may include actuator 210 placing a lens in and out of the optical axis of optics system 200. Other embodiments of actuator 210 consistent with FIG. 2 may displace at least one of the optical elements in system 200 from a first position to a second position along the optical axis of system 200.

Figure 3:
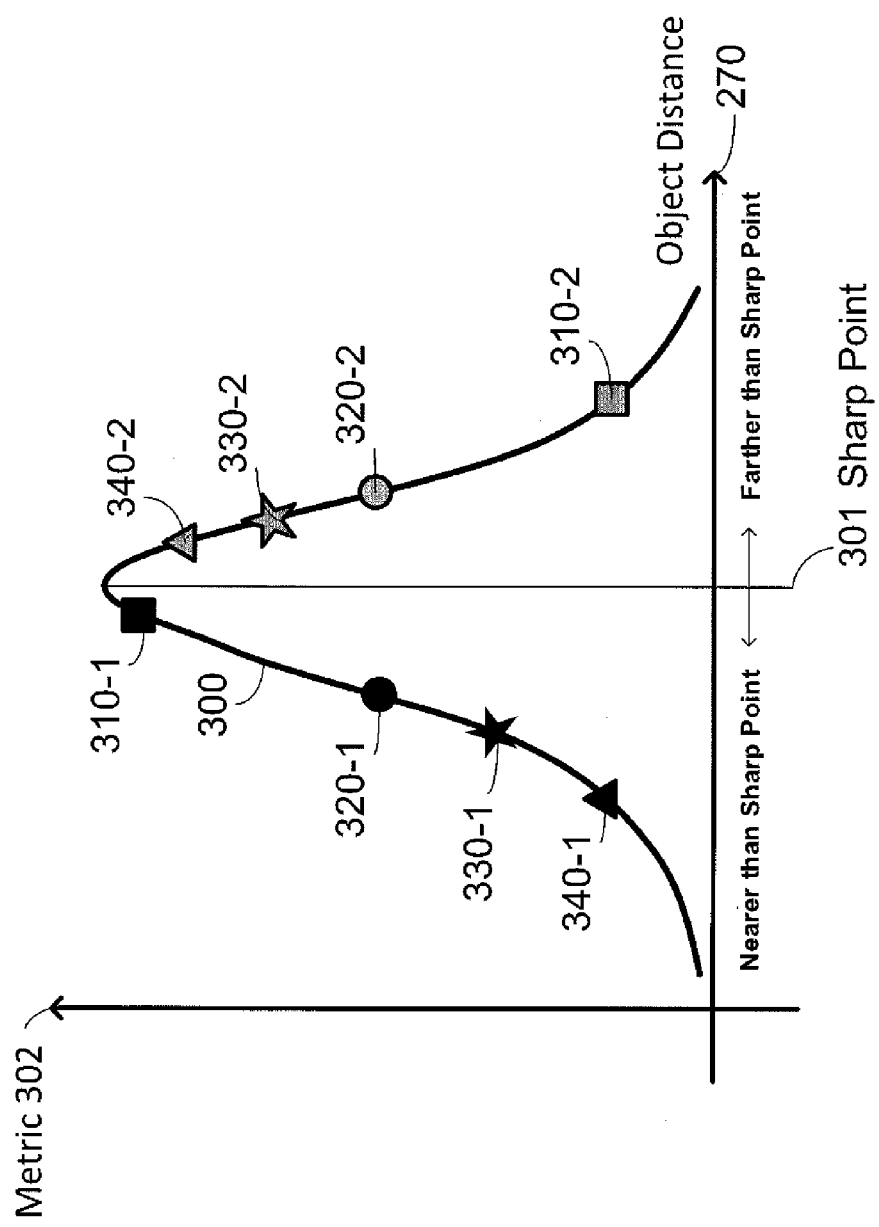
FIG. 3 shows a through focus sharpness graph for an optics system as a function of an object position, according to some embodiments.

FIG. 3 shows a through-focus sharpness graph 300 for optics system 200 as a function of object distance 270, according to some embodiments. The abscissa in FIG. 3 corresponds to the object distance 270, and the ordinate corresponds to a metric 302. Metric 302 used in embodiments consistent with FIG. 2 may be any "sharpness" metric to determine the image quality. Every optics system 200 has a unique graph 300 depending on its design. A sharp point 301 in the through-focus graph represents an object position for which the object is located in the image plane of optics system 200. The image plane of optics system 200 may be defined as the plane orthogonal to the optical axis of system 200 for which an object located at a distance (corresponding to sharp point 301) renders a maximum value of sharpness metric 302.

The image plane is thus defined in relation to an optical system configuration and a certain object distance. The image plane may coincide with the position of image sensor 215 for a certain object distance 270 and certain configuration of optics system 200. In such a case, "sharpness" metric 302 obtained for the captured image may have a maximum value. This may not always be the case, and the image plane of system 200 may be located somewhat before or after a plane where image sensor 215 is located. In such cases, "sharpness" metric 302 may have a value that is not a maximum, such as illustrated in measurements 310-1 through 340-1, and 310-2 through 340-2 (FIG. 3).

The graph presents the results of two sets of measurements. Measurements 310-1, 320-1, 330-1, and 340-1 are for objects located at distances nearer than sharp point 301. Measurements 310-2, 320-2, 330-2, and 340-2 are for objects at distances farther than sharp point 301. Electrical appliance 100 examines sharpness metric 302 for two configurations or states, and determines via an interpolation calculation the position at which the object is located. The two states or configurations may be provided by actuator 210. In embodiments consistent with FIG. 3, measurements 310-1 and 310-2 may correspond to the same object 260, located at an object distance 270-1 (not shown in FIG. 3). Thus, the difference between the values of metric 302 in measurement 310-1 and 310-2 may result from using a first system configuration to collect measurement 310-1, and a second system configuration to collect measurement 310-2. Likewise, measurements 320-1 and 320-2 may be obtained for the same object 260 at a distance 270-2 (not shown in FIG. 3), using a first system configuration (value 320-1) and a second system configuration (value 320-2). Measurements 330-1 and 330-2 may be obtained for the same object 260 at a distance 270-3 (not shown in FIG. 3), using a first system configuration (value 330-1) and a second system configuration (value 330-2). Measurements 340-1 and 340-2 may be obtained for the same object 260 at a distance 270-4 (not shown in FIG. 3), using a first system configuration (value 340-1) and a second system configuration (value 340-2).

According to embodiments consistent with FIG. 3, the first system configuration for optical system 200 may be the same for all measurements 310-1 through 340-1. And the second system configuration for optical system 200 may be the same for all measurements 310-2 through 340-2. For example, a first configuration for system 200 may be such that object 260 produces sharp point 301 at a distance 270 that is farther from camera 110 than all distances 270-1, 270-2, 270-3 and 270-4. Such configuration may be referred to as a "far distance" configuration. Thus, in a "far distance" configuration, system 200 produces an image plane on the plane of image sensor 210 for object 260 located at a far distance. In a "far distance" configuration, distances 270-1, 270-2, 270-3 and 270-4 are nearer to camera 110 than the sharp point position.

A second configuration for system 200 may be such that object 260 produces sharp point 301 at a distance 270 that is closer to camera 110 than all distances 270-1, 270-2, 270-3 and 270-4. Such configuration may be referred to as a "near distance" configuration. Thus, in a "near distance" configuration, system 200 produces an image plane on the plane of image sensor 210 for object 260 located at a near distance. In a "near distance" configuration, distances 270-1, 270-2, 270-3 and 270-4 are farther than the sharp point position.

According to measurements illustrated in FIG. 3, object distances 270-1, 270-2, 270-3, and 270-4 may be such that they are all shorter than the far distance for the 'far distance' configuration. And distances 270-1, 270-2, 270-3, and 270-4 may all be longer than the distance for the 'near distance' configuration.

Thus, in embodiments consistent with FIG. 3, for every object distance 270-1, 270-2, 270-3 and 270-4 there may be two image frames collected in sensor 215. One set of image frames may reside in the near-object side of the image plane (points 310-1 through 340-1). That is, distances 270-1 through 270-4 may be nearer to camera 110 than sharp point 301 for measurements 310-1 through 340-1. And another set of image frames may reside on the far-object side of the image plane (points 310-2 through 340-2). That is, distances 270-1 through 270-4 may be farther than sharp point 301 for measurements 310-2 through 340-2. Note that sharp point 301 may not be the same for the first set of measurements 310-1 through 340-1 relative to the second set of measurements 310-2 through 340-2.

Using the value of metric 302 for each of the two optics configurations, a function may be interpolated to find the distance 270 of object 260 to camera 110. For example, it may be possible to evaluate distance 270 interpolating the ratio between metric value 302 in a "near distance" configuration and metric value 302 in a "far distance" configuration.

In the case illustrated in FIG. 3 a ratio may be obtained between metric values 310-1 to 310-2, 320-1 to 320-2, 330-1 to 330-2, and 340-1 to 340-2. Each of these ratios may be associated with an object distance. For example, the ratio of metric 302 in 310-1 to metric 302 in 310-2 may be related to distance 270-1. Likewise, the ratio of metric 302 in 320-1 to metric 302 in 320-2 may be related to distance 270-2. The ratio of metric 302 in 330-1 to metric 302 in 330-2 may be related to distance 270-3. And the ratio of metric 302 in 340-1 to metric 302 in 340-2 may be related to distance 270-4. The specific form of the relation between the ratio of a "far distance" metric to a "near distance" metric and object distance 270 may vary. A one-to-one correspondence may be established for at least a portion of object distances 270 shorter than a far distance and longer than a near distance.

Some embodiments consistent with FIG. 3 may include a function of metric value 302 for a "near distance" configuration, and the metric value 302 for a "far distance" configuration other than a ratio. Furthermore, some embodiments may include a function of metric value 302 for a "near distance" configuration and the metric value 302 for a "far distance" configuration that is a function of the ratio of the two values. Further details of how to obtain object distance 270 interpolating a function of a metric value 302 for a "near distance" configuration and a metric value 302 for a "far distance" configuration are provided, for example, in relation to FIGS. 4A-4D below.

Figure 4A:
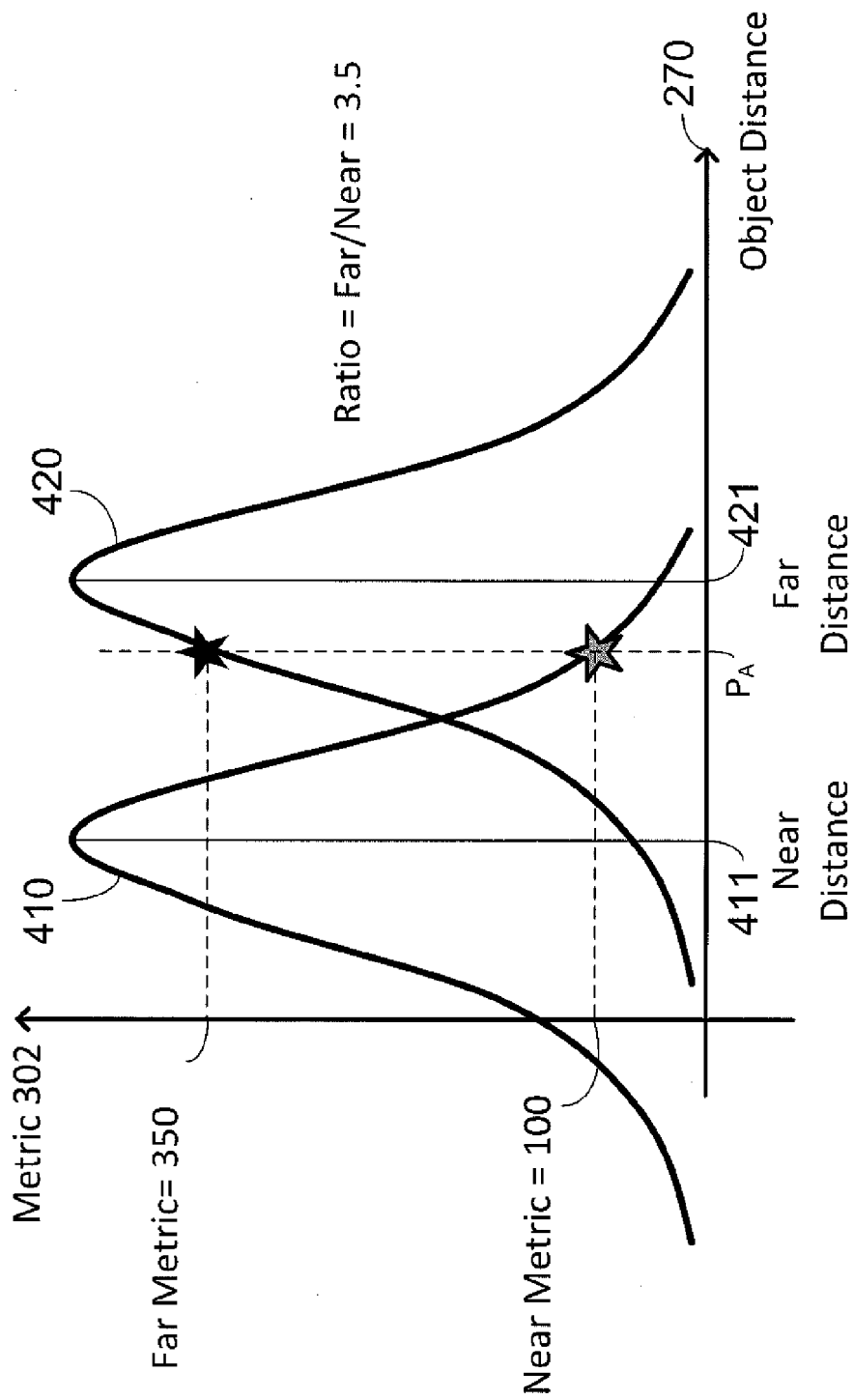
FIG. 4A shows measurements of image sharpness for an object at a first position with an optical system in a first focusing state and a second focusing state, according to some embodiments.

FIG. 4A shows measurements of image sharpness for an object at a first position $P_A$ with optical system 200 in a first focusing state and a second focusing state, according to some embodiments. In embodiments consistent with FIG. 3, a first focusing state may be a configuration of optical system 200 such that a through focus sharpness curve 410 has maximum value for object 260 at a near distance 411. Also, a second focusing state may be a configuration of optical system 200 such that a through focus sharpness curve 420 has maximum value for object 260 at a far distance 421.

As illustrated in FIG. 4A, distance $P_A$ is shorter than far distance 421 and longer than near distance 411. In the example shown in FIG. 4A, 'near metric' is the ordinate of the point in curve 410 having abscissa $P_A$, equal to 100. Likewise, 'far metric' is the ordinate of the point in curve 420 having abscissa $P_A$, equal to 350. The ratio of 'far metric' to 'near metric' is thus 350/100=3.5. Object distance $P_A$ is therefore associated to a value 3.5, according to embodiments consistent with FIG. 4A.

Figure 4B:
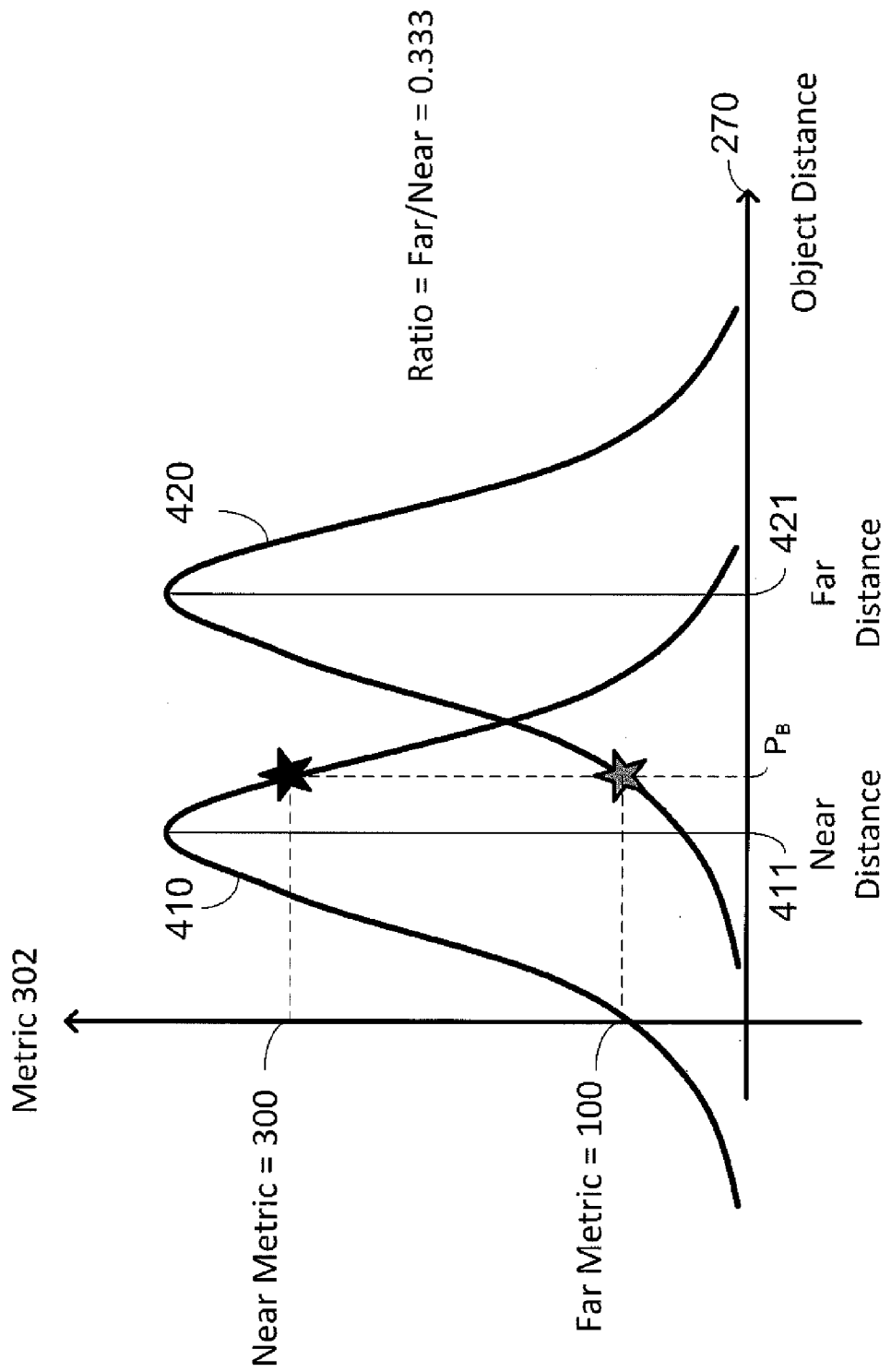
FIG. 4B shows measurements of image sharpness for an object at a second position with an optical system in a first focusing state and a second focusing state, according to some embodiments.

FIG. 4B shows measurements of image sharpness for an object at a second position $P_B$ with optical system 200 in a first focusing state and a second focusing state, according to some embodiments. Note that the first focusing state and the second focusing state of optical system 200 in FIG. 4B are consistent with those illustrated in FIG. 4A. Thus, in embodiments consistent with FIGS. 4A and 4B, near distance 411 and far distance 421 may be the same.

As illustrated in FIG. 4B, distance $P_B$ is shorter than far distance 421 and longer than near distance 411. However, as shown in FIG. 4B, $P_B$ may be shorter than $P_A$. In the example shown in FIG. 4B, 'near metric' value is equal to 300. Likewise, 'far metric' value is equal to 100. The ratio of 'far metric' to 'near metric' values is thus 100/300=0.333. Object distance $P_B$ is therefore associated to a value 0.333, according to embodiments consistent with FIGS. 4A and 4B.

Figure 4C:
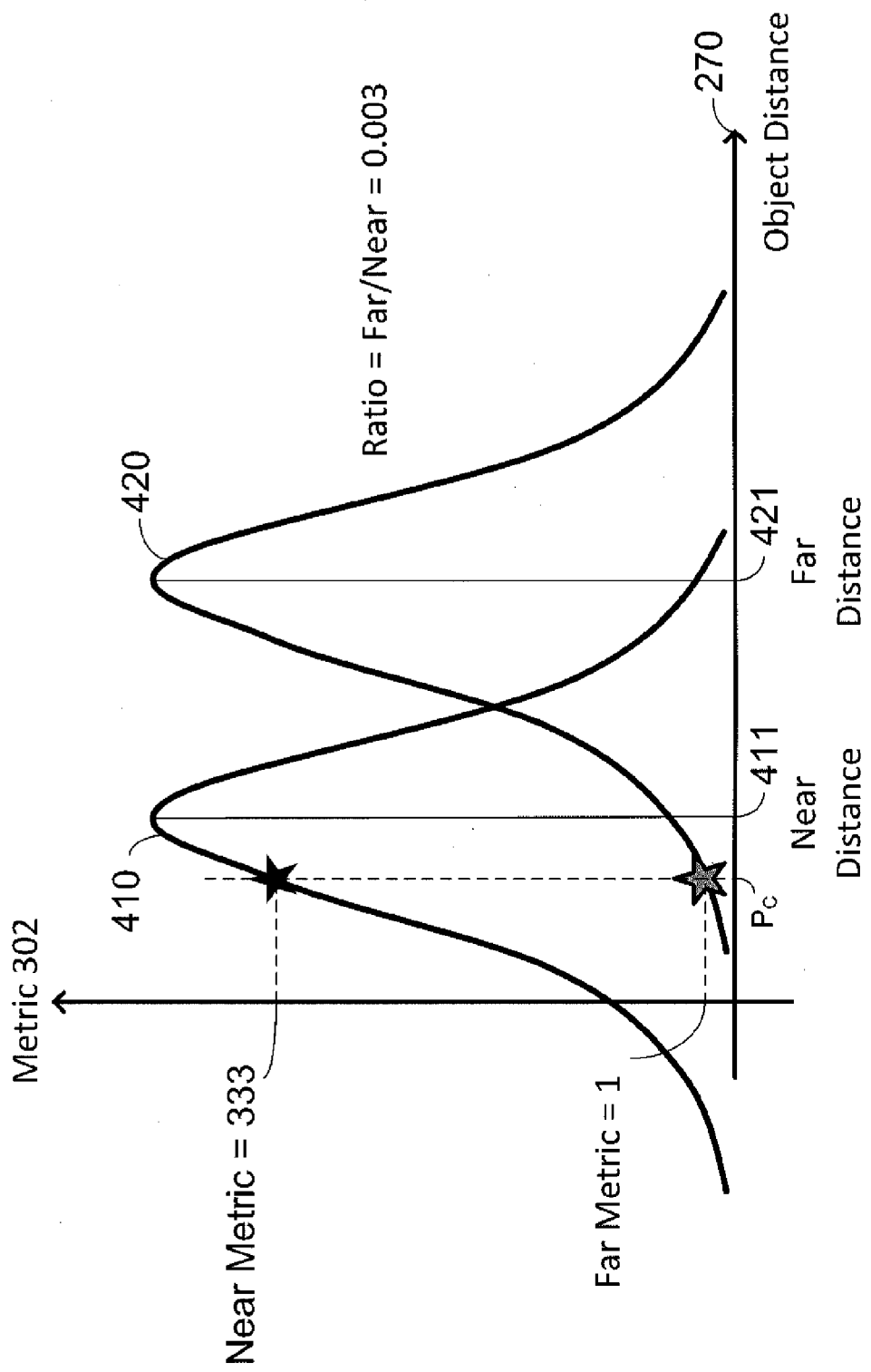
FIG. 4C shows measurements of image sharpness for an object at a third position with an optical system in a first focusing state and a second focusing state, according to some embodiments.

FIG. 4C shows measurements of image sharpness for an object at a third position $P_C$ with optical system 200 in a first focusing state and a second focusing state, according to some embodiments. Note that the first focusing state and the second focusing state of optical system 200 are consistent with those illustrated in FIGS. 4A and 4B. Thus, in embodiments consistent with FIGS. 4A, 4B and 4C, near distance 411 and far distance 421 may be the same.

As illustrated in FIG. 4C, distance $P_C$ is shorter than far distance 421 and near distance 411. Moreover, as shown in FIG. 4C, $P_C$ may be shorter than $P_D$ and $P_A$. In the example shown in FIG. 4C, 'near metric' value is equal to 333. Likewise, 'far metric' value is equal to 1. The ratio of 'far metric' to 'near metric' values is thus 1/333=0.003. Object distance $P_C$ may therefore be associated to a value 0.003, according to embodiments consistent with FIGS. 4A, 4B and 4C.

Figure 4D:
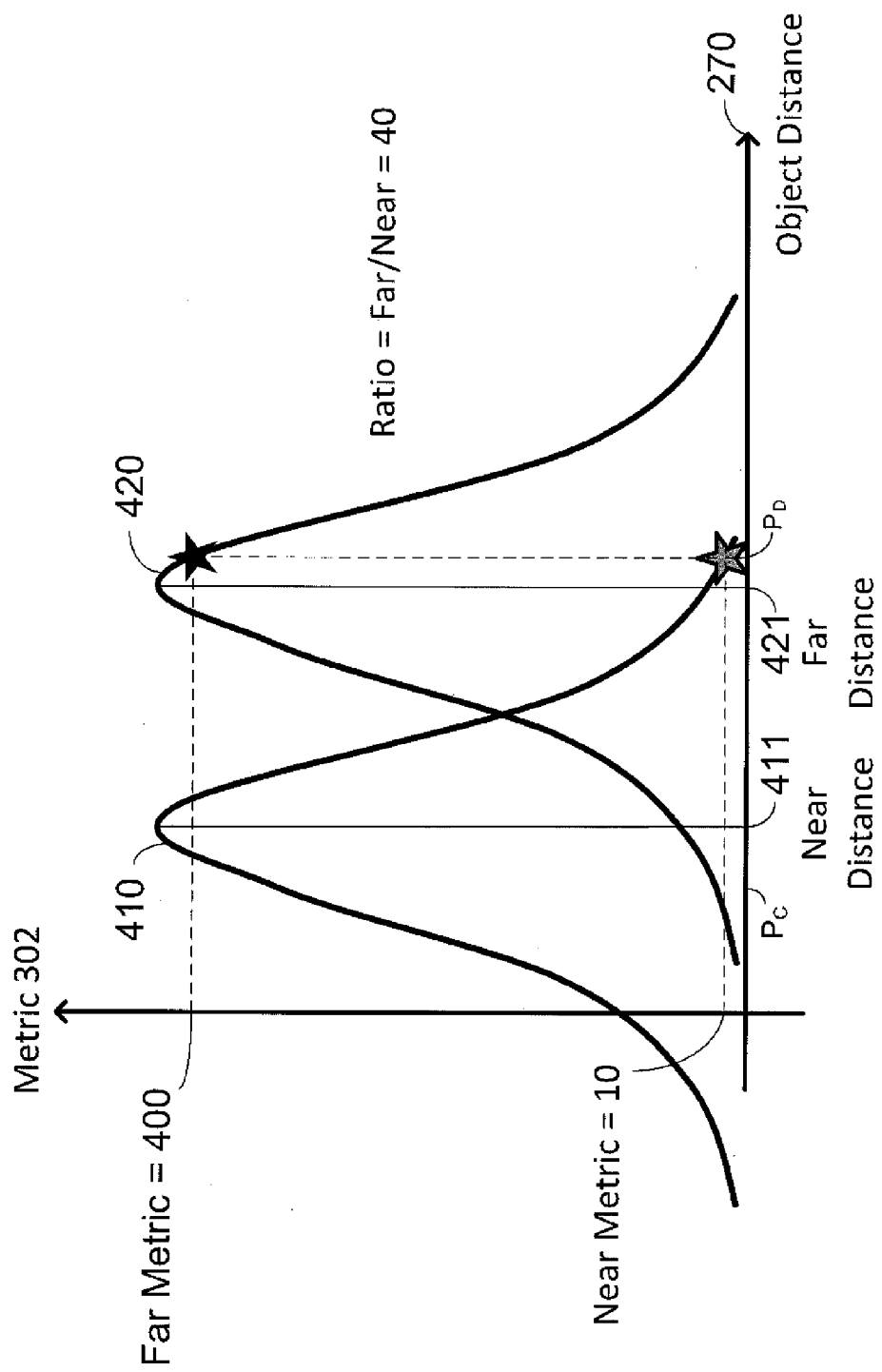
FIG. 4D shows measurements of image sharpness for an object at a fourth position with an optical system in a first focusing state and a second focusing state, according to some embodiments.

FIG. 4D shows measurements of image sharpness for an object at a fourth position $P_D$ with optical system 200 in a first focusing state and a second focusing state, according to some embodiments. Note that the first focusing state and the second focusing state of optical system 200 are consistent with those illustrated in FIGS. 4A, 4B, and 4C. Thus, in embodiments consistent with FIGS. 4A, 4B, 4C and 4D, near distance 411 and far distance 421 may be the same.

As illustrated in FIG. 4D, distance $P_D$ is longer than far distance 421. Moreover, as shown in FIG. 4D, $P_D$ may be longer than $P_A$, $P_B$, and $P_C$. In the example shown in FIG. 4D, 'near metric' value is equal to 10. Likewise, 'far metric' value is equal to 400. The ratio of 'far metric' to 'near metric' values is thus 400/10=40. Object distance $P_D$ may therefore be associated to a value 40, according to embodiments consistent with FIGS. 4A, 4B, 4C, and 4D.

The values provided for 'near metric' and 'far metric' values in FIGS. 4A-4D are exemplary only, and do not necessarily reflect a true measurement performed for a specific object. Embodiments consistent with the descriptions provided in FIGS. 4A-4D may have different values for 'near metric' and 'far metric' measurements according to a specific object 260 located at a certain distance 270.

Figure 5:
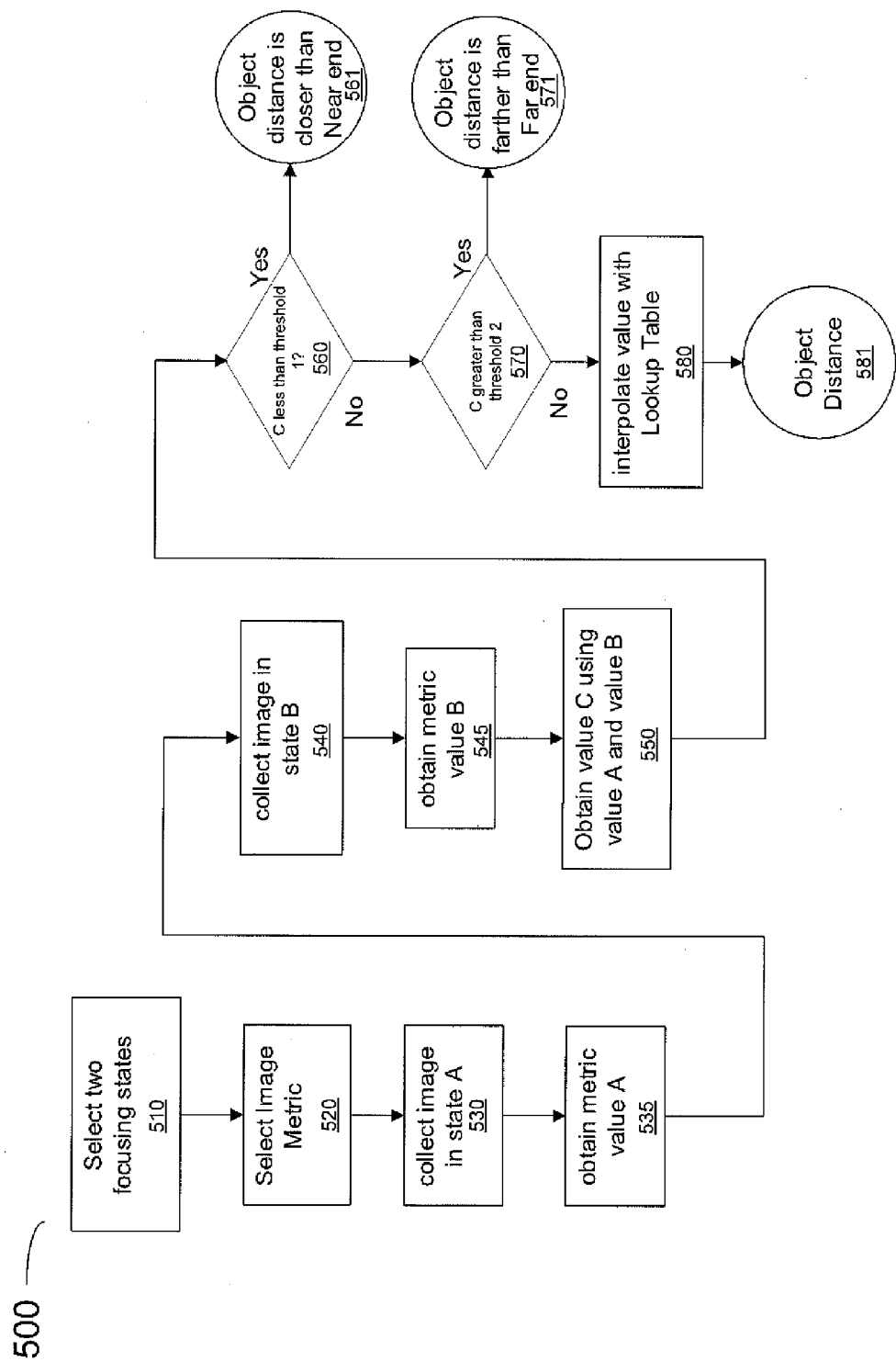
FIG. 5 shows a flow chart for a method to calculate an approximate distance between a camera and an object, according to some embodiments.

FIG. 5 shows a flow chart for a method 500 to calculate an approximate distance between camera 110 and object 260, according to some embodiments. Two focusing states for optical system 200 are selected, in 510. For example, a first focusing state may be a configuration of optics system 200 wherein an object at far distance 421 produces an image plane at image sensor 215. A second focusing state may be a configuration of optics system 200 wherein an object at near distance 411 has an image plane at image sensor 215. Near distance 411 and far distance 421 may be consistent with FIGS. 4A-4D, according to some embodiments.

An image metric is selected, in 520. The image metric may be a sharpness metric, whereby an array of pixels in image sensor 215 may be converted into a value that represents a quality of the image. For example, in some embodiments the image metric may be the same metric used to determine a best focus position using a window of pixels in the array of pixels provided by image sensor 215. A window of pixels may be a plurality of pixels selected from a portion of the array of pixels provided by image sensor 215. Image metric may be consistent with metric 302 in FIGS. 3 and 4A-4D.

Some embodiments consistent with FIG. 5 may use image metric 302 calculated as the standard deviation in the pixel values over a window of pixels:

$$\text{Metric } 302 = \frac{1}{M \cdot N} \sqrt{\sum_i \sum_j (x_{ij} - \bar{x})^2} \quad \text{Eq. (1)}$$

Where $x_{ij}$ is the digital value provided by sensor 215 for a pixel in the i-th row and the j-th column in a two-dimensional pixel array. The summation in Eq(1) may take place over a number 'M' of rows and a number 'N' of columns in the pixel array, where 'M' and 'N' are integer numbers. Thus defining a window of 'M×N' pixels.

Other embodiments consistent with FIG. 5 may use image metric 302 calculated as the sum of the absolute differences relative to a mean over a window of pixels:

$$\text{Metric } 302 = \sum_i \sum_j |x_{ij} - \bar{x}| \quad \text{Eq. (2)}$$

Further embodiments consistent with the method of FIG. 5 may use image metric 302 calculated as the energy after high-pass filtering with a kernel including a preselected frequency response. The kernel may be symmetric or not. For example, a kernel, h, may be expressed as a matrix:

$$h = \begin{matrix} -1 & -1 & -1 \\ -1 & 8 & -1 \\ -1 & -1 & -1 \end{matrix} \quad \text{Eq. (3)}$$

And a filtering of array x may result in array $y = x \otimes h$ as follows:

$$y_{ij} = \sum_{l=1}^{3} \sum_{m=1}^{3} h_{lm} \cdot x_{(i+2-l)(j+2-m)} \quad \text{Eq. (4)}$$

The energy of array y may be calculated as a sum of squared values:

$$\text{Metric } 302 = \sum_i \sum_j y_{ij}^2 \quad \text{Eq. (5)}$$

Where the 'ij' summation may take place over a window having 'M' rows and 'N' columns.

Moreover, embodiments consistent with the method of FIG. 5 may use frequency selection techniques that take into account low frequencies and high frequencies to obtain metric 302. Embodiments consistent with the method of FIG. 5 may further combine one or more image metrics as described above.

According to the flow chart illustrated in FIG. 5, method 500 includes collecting a first image from object 260 located at distance 270, in 530. The image is collected with optics system 200 in a configuration corresponding to the first focusing state selected in 510. The image is converted to a pixel array in sensor 215, and sent to memory 220 where processor 250 may perform the calculations described above to provide a first metric 302-1 for the first image, in 535. With the same object 260 placed at the same distance 270, a second image is collected in 540 with optics system 200 in a configuration corresponding to the second focusing state selected in 510. The second image may be provided by sensor 215 as a pixel array to memory 220. A second metric value 302-2 is obtained for the second image, in 545. The second metric value may be obtained by processor 250 accessing memory 220, according to embodiments consistent with FIG. 5. The first metric value 302-1 in 535 may be obtained using the same metric as the one used to obtain second metric value 302-2 in 545, according to some embodiments. Other embodiments may use a different metric for first metric value 302-1 in 535, and a different metric for second metric value 302-2 in 545.

Having first metric value 302-1 and second metric value 302-2, a third value 'C' is obtained in 550. Value 'C' may be a function of metric values 302-1 and 302-2, obtained by processor 250. For example, in embodiments consistent with FIGS. 4A-4D, value 'C' may be the ratio between metric value 302-2 and metric value 302-1. Some embodiments may use the reverse computation, namely, having value 'C' equal to the ratio between metric value 302-1 and metric value 302-2. Other embodiments may obtain value 'C' from metric values 302-2 and 302-1 using a different functional relation.

Having a value 'C,' some embodiments may compare 'C' with a first threshold in step 560. If value 'C' is less than a first threshold $T_1$, then a determination may be made that object distance 270 is closer than a near end in 561. A near end may be near distance 411 in embodiments consistent with FIGS. 4A-4C. For example, in embodiments consistent with FIG. 4C, a value 'C' may be equal to 0.003, and may be smaller than a first threshold $T_1$. Thus, a determination may be made that distance $P_C$ is less than near distance 411. Also consistent with method 500 in FIG. 5, value 'C' may be greater than first threshold $T_1$ and thus compared to a second threshold $T_2$ in 570. If value 'C' is greater than second threshold $T_2$, then a determination may be made that object distance 270 is greater than a far end in 571. In embodiments consistent with FIGS. 4A-4D a far end may be far distance 421. For example, in embodiments consistent with FIG. 4D, value 'C' may be equal to 40, and may be greater than second threshold $T_2$. In such case, a determination may be made that distance $P_D$ is greater than far distance 421.

If in 560 and 570 it is found that value 'C' is greater than or equal to $T_1$, and smaller than or equal $T_2$, then an estimation may be made in 580 using a lookup table and value 'C.' The lookup table may have a plurality of values '$C_i$,' each associated to an object distance '$D_i$.' In some embodiments of method 500, estimation 580 (e.g., interpolation) may include finding two values '$C_a$' and '$C_b$' in the lookup table such that $C_a <= C <= C_b$. Retrieving values $D_a$ and $D_b$ from the lookup table, a distance 'D' may be obtained as:

$$D = D_a + [(D_b - D_a)/(C_b - C_a)] \times (C - C_a)$$
Eq. (6)

Other embodiments of method 500 may use in 580 a polynomial interpolation including a plurality or all of the data points in the lookup table. For example, some embodiments may use a Lagrange interpolation as follows. The lookup table may include a total of 'K' points, each point including a value '$C_i$' and a distance '$D_i$' associated to value '$C_i$.' A first polynomial for value 'C' as a variable may be created as:

$$P(C) = \Pi_i (C - C_i)$$
Eq. (7)

Where the index 'I' runs from 1 to K. Then, a set of K polynomials may be created as:

$$P_i(C) = P(C)/(C - C_i)$$
Eq. (8)

And an interpolation polynomial may be found from (7) and (8) as:

$$P_{int}(C) = \sum_i D_i \cdot \frac{P_i(C)}{P_i(C_i)}$$
Eq. (9)

Thus, some embodiments of method 500 consistent with FIG. 5 may obtain a distance D from value C by calculating $D = P_{int}(C)$, with $P_{int}$ as in (9) above. Object distance 270, in 581, is thus obtained from the value D interpolated in 580.

According to embodiments consistent with method 500 described in reference to FIG. 5, the object distance 270 may be between near end 561 and far end 571. More generally, method 500 may be applied to object distance 270 that may be a shorter distance than near end 561. Furthermore, method 500 may be applied to object distance 270 that is a farther distance than far end 571.

Figure 6:
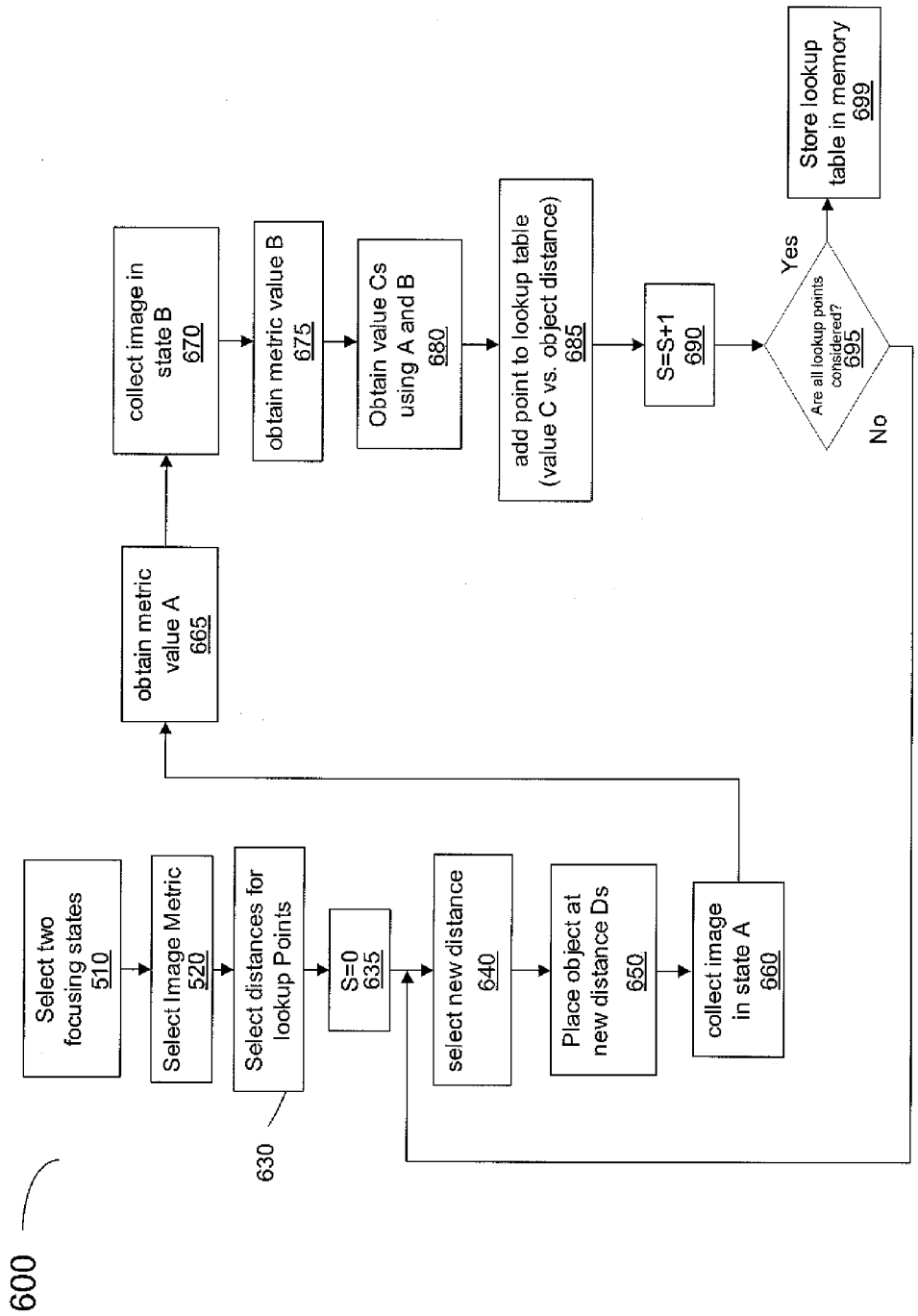
FIG. 6 shows a flow chart for a method to generate a lookup table for a plurality of object distances, according to some embodiments.

FIG. 6 shows a flow chart for a method 600 to generate the lookup table for a plurality of object distances 'Di' according to some embodiments. Two focusing states for optics system 200 are selected in 510, and an image metric 302 is selected in 520. The details of the selections 510 and 520 have been discussed in detail with respect to method 500 illustrated in FIG. 5, and they will not be repeated here. A plurality of 'K' object distances $D_i$ is also selected in 630. In some embodiments consistent with FIGS. 4A-4D, distances Di may be such that for any Di, (near distance 411)<=Di<=(far distance 421). Further according to some embodiments, distances Di may be evenly spaced between a minimum value at near distance 411, and a maximum value at far distance 421.

A counter 'S' is set equal to zero, in 635. In 640, distance $D_s$ is selected, where S is the value of the counter that is initialized to zero, in 635. Object 260 is placed at distance 270 equal to Ds in 650. A first image is collected for object 260, in 660, using a first focusing state as selected in 510. Further details of step 660 may be as described in relation to step 530 of method 500 (FIG. 5). A first metric value 302-1 for the first image of object 260 at distance Ds is obtained, in 665. Further details about obtaining first metric value 302-1 for the first image in 665 may be as described in relation to step 535 in method 500 (FIG. 5).

A second image is collected from object 260 at a distance Ds from camera 110 using optics system 200 configured to the second focusing state, in 670. Second metric value 302-2 is obtained in 675. Further details relating to obtaining second metric value 302-2 may be as described in relation to step 545 in method 500 (FIG. 5).

Having metric values 302-1 and 302-2, a value 'Cs' may be obtained in 680. Further details about obtaining value 'Cs' from metric values 302-1 and 302-2 may be as described in step 550 of method 500 (FIG. 5). Values 'Cs' and 'Ds' form a new point added to the lookup table in 685. In 690, counter S is incremented by 1, indicating the current number of points included in the lookup table. In 695, it is determined if all the distances for the lookup table selected in 630 have been considered. If the answer is 'Yes,' then the lookup table is stored in memory and the method is terminated in 699. If the answer in 695 is 'No,' then the method is started in 640 by selecting a new distance, $D_s$. A Table I below shows an example of the lookup table having K=9 points.

TABLE I

| | Object Distance | | | | | | | | |
|---|---|---|---|---|---|---|---|---|---|
| | Infinity | 2-3 m | 1 m | 70 cm | 30 cm | 25 cm | 20 cm | 15 cm | 10 cm |
| Ratio | 50 | 35 | 15 | 6 | 1 | 1/6 | 1/20 | 1/50 | 1/100 |

Figure 7:
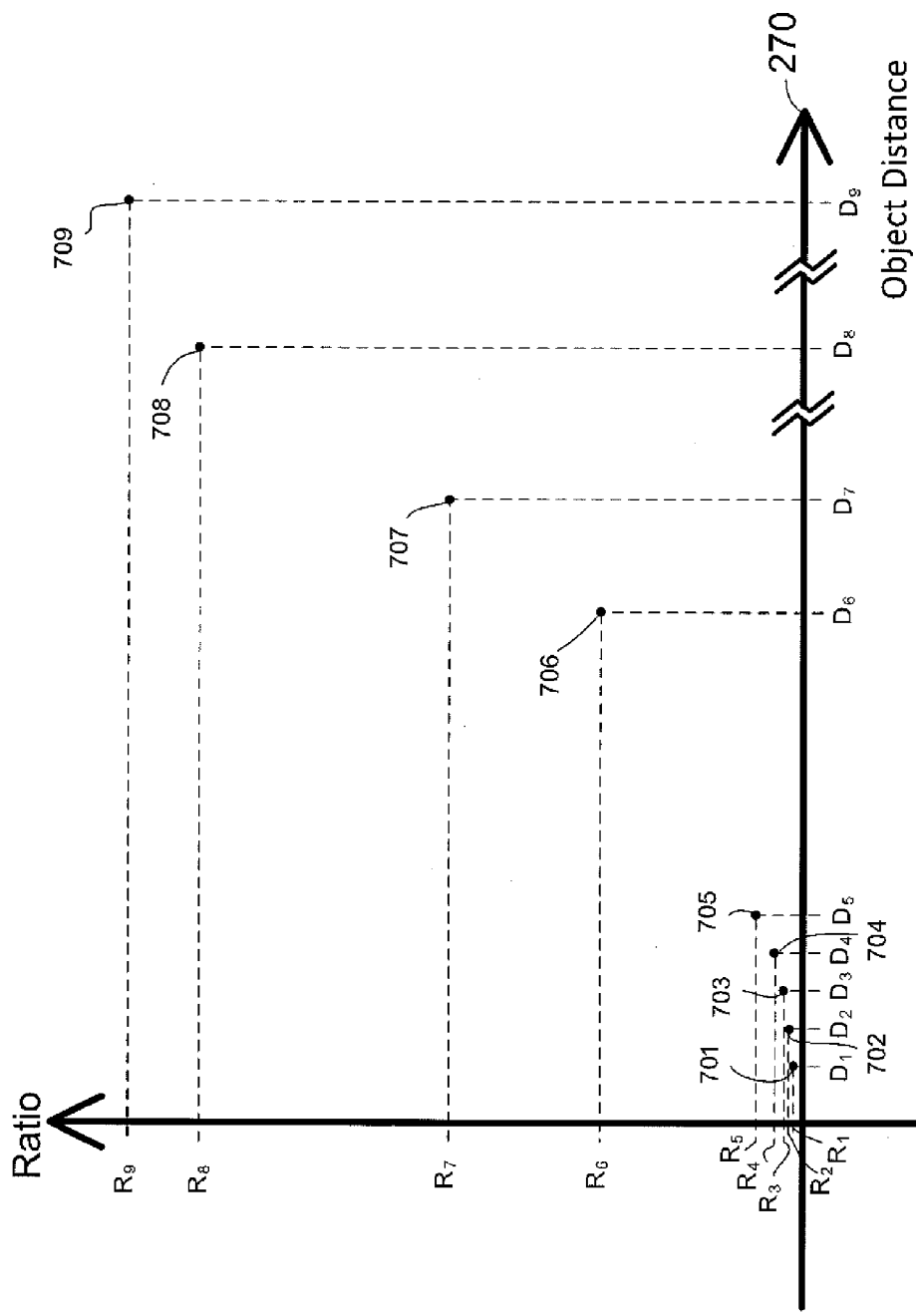
FIG. 7 shows a plot of ratio values obtained using the method of FIG. 6 versus object distances, according to some embodiments.

FIG. 7 shows a plot of ratio values obtained using the method described in reference to FIG. 6 versus object distances, according to some embodiments. Points 701-709 shown in FIG. 7 correspond to the values listed in Table I above. In the abscissa of FIG. 7, the object distance, D, is plotted as in Table I, and the ordinate corresponds to the ratio, R, in Table I. Thus, point 701 in FIG. 7 has coordinates $(D_1, R_1)$=(10 cm, 1/100); point 702 has coordinates $(D_2, R_2)$=(15 cm, 1/50); point 703 has coordinates $(D_3, R_3)$=(20 cm, 1/20); point 704 has coordinates $(D_4, R_4)$=(25 cm, 1/6); point 705 has coordinates $(D_5, R_5)$=(30 cm, 1); point 706 has coordinates $(D_6, R_6)$=(70 cm, 6); point 707 has coordinates $(D_7, R_7)$=(1 m, 15); point 708 has coordinates $(D_8, R_8)$=(2-3 m, 35); and point 709 has coordinates $(D_9, R_9)$=(Infinity, 50).

Figure 8A:
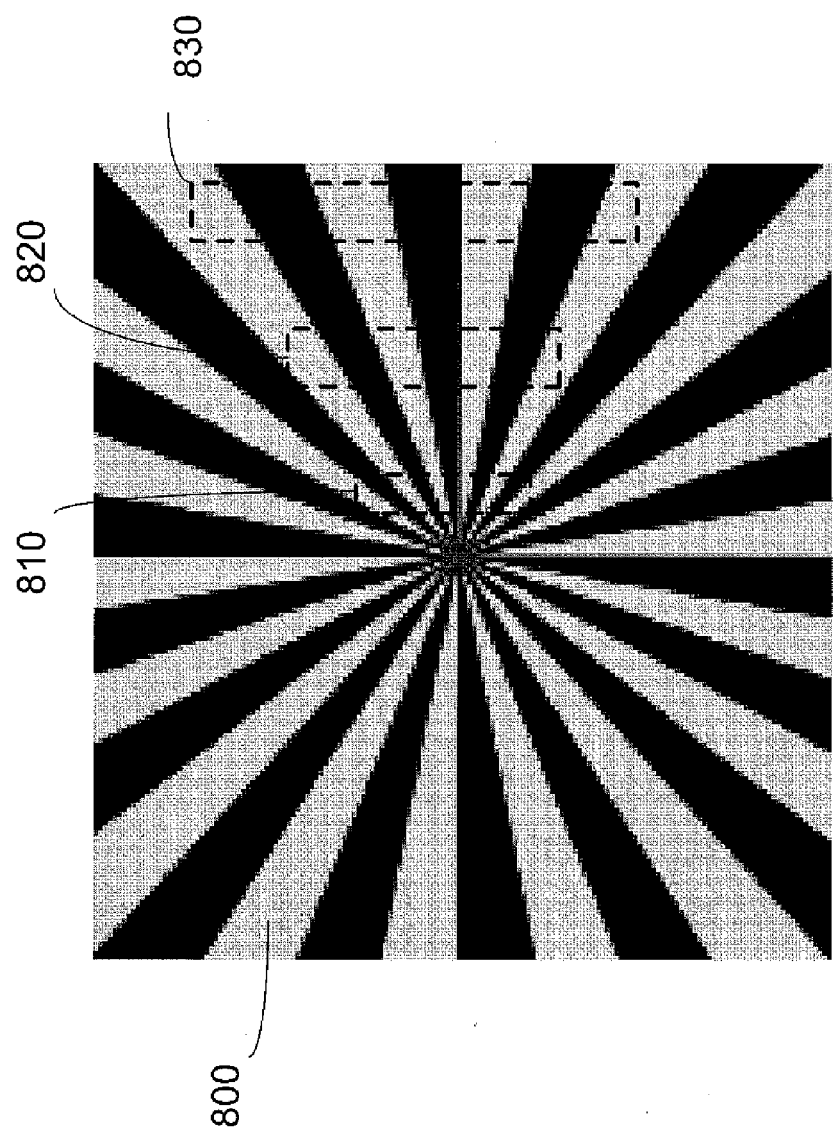
FIG. 8A shows a sample image used for calibration of an electronic appliance as in FIG. 2 to find an object distance using a method as in FIG. 5, according to some embodiments.

FIG. 8A shows a sample image 800 used for calibration of electronic appliance 100 to find object distance 270 using method 500, according to some embodiments. The calibration may include imaging portions 830, 820, and 810 in image 800 and using method 500 to determine a corresponding distance D830, D820, and D810 for each portion. Thus, by having a preselected value D' for distances D'810, D'820, and D'830, a comparison may be obtained with the D values. Further adjustments in method 500 may be made in order to obtain values D closer to D'. For example, interpolating step 580 may be enhanced by using more complex interpolating functions.

Note that in embodiments consistent with FIG. 8A, different portions of the same image (e.g., 810, 820, and 830) may reflect objects located at different distances. Thus, in some embodiments, an electronic appliance as disclosed herein may be able to determine relative positions of objects within the same image frame. For example, in some embodiments, method 500 (FIG. 5) may be used for a window of pixels including portion 810, to find a first distance of a first object included in portion 810. Furthermore, method 500 (FIG. 5) may be used for a window of pixels including portion 820, to find a second distance of a second object included in portion 820. Thus, the relative positions of a first object and a second object (or other objects) within image 800 may be obtained.

Some embodiments may include a slight modification to method 500 (FIG. 5), wherein a first window of pixels including portion 810 may be used as the first image in step 530 and a second window of pixels including portion 820 may be used as the second image in step 540. Furthermore, a third window of pixels may be selected including an object in the image at a known distance, forming a reference image portion. Thus, a value $C_1$ may be obtained from the metric values in the first image and the reference image portion (as in step 550, FIG. 5). Likewise, a value $C_2$ may be obtained from the metric values in the second image and the reference image portion (as in step 550, FIG. 5). In some embodiments values C1 and C2 may be interpolated separately using a lookup table or a calibration database (step 580) to determine a first distance for the first image and a second distance for the second image. Some embodiments may further directly determine the relative distance between objects included in the first window and objects included in the second window by comparing the values $C_1$ and $C_2$ according to a calibration curve or a lookup table, as would be understood by one skilled in the art.

In some embodiments, adjustments to the lookup table may be obtained. For example, a larger number of distance points Ds may be selected in step 630. Some embodiments may also adjust method 500 by selecting a different metric measure in step 520, or complementing an image metric with a second image metric.

Figure 8B:
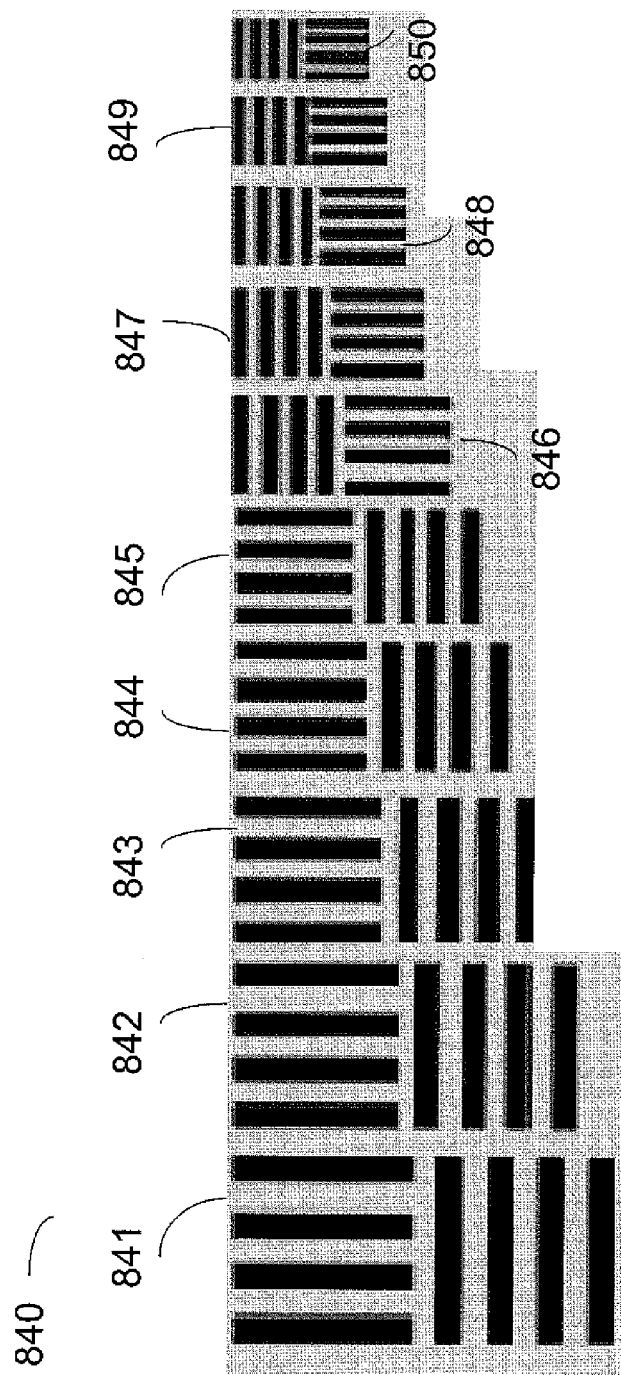
FIG. 8B shows a sample image used for calibration of an electronic appliance as in FIG. 2 to find an object distance using a method as in FIG. 5, according to some embodiments.

FIG. 8B shows a sample image 840 used for calibration of electronic appliance 100 to find object distance 270 using method 500, according to some embodiments. Image 840 may include sub-images 841 through 850 where each sub-image may correspond to a predetermined object distance D'841 to D'850. Then, by using appliance 100 with method 500, distance values D841 through D850 may be obtained. Adjustments to method 500 as described above may then be performed according to the error measured between the D values and the D' values.

Figure 8C:
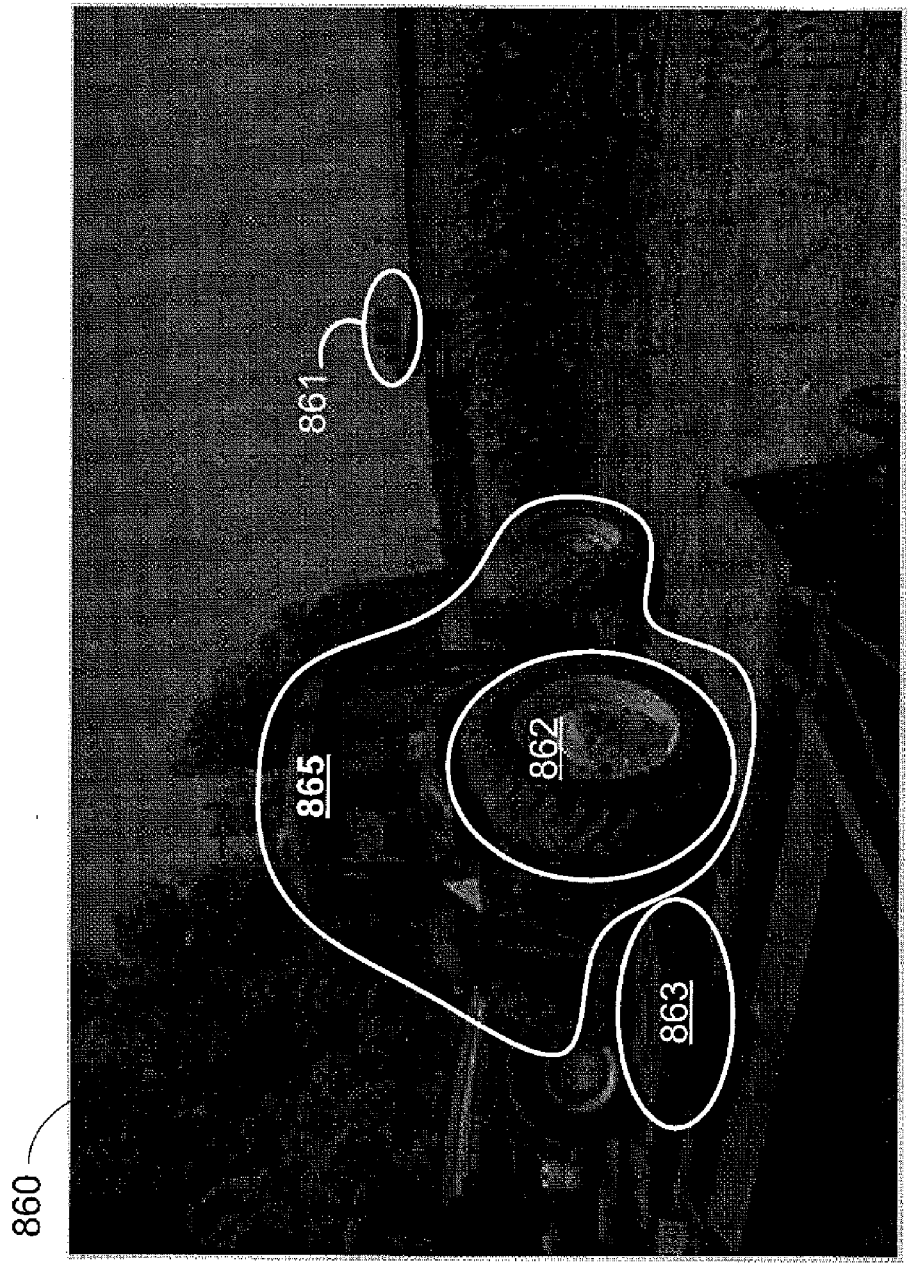
FIG. 8C shows a sample image used for calibration of an electronic appliance as in FIG. 2 to find an object distance using a method as in FIG. 5, according to some embodiments.

FIG. 8C shows a sample image 860 used for calibration of electronic appliance 100 to find object distance 270 using method 500, according to some embodiments. Image 860 may be a sharp image having a depth of focus depicting several objects as 861, 862, and 863, located at different, known distances, D'861, D'862, and D'863 from appliance 100. Distances D861, D862, and D863 may be obtained using appliance 100 and method 500, and the difference between the D values and the D' values may be adjusted by implementing changes in method 500 as discussed above.

Note that by selecting pixel windows appropriately, embodiments consistent with FIG. 8C may be able to determine object positions for different objects within the same image. Furthermore, portions of the same object may be selected by different windows of pixels as described in relation to method 500 (FIG. 5). Thus, an extended object, or a 3D object having portions located at different distances from appliance 100, may be "mapped" out according to embodiments disclosed herein. For example, the dimensions of tractor 865 shown in FIG. 8C may be obtained by estimating the relative distances between its wheels (including 862) and the cabin of the object. Furthermore, the position of tractor 865 in relation to other objects in the figure may be obtained as well.

Thus, in some embodiments disclosed herein, a depth map may be built from an image captured by camera 110 in appliance 100 by using method 500 (FIG. 5) for windows of pixels selected from different portions within the same image. In some embodiments, method 500 (FIG. 5) may be used with any pre-existing image, having an appropriately calibrated lookup table as obtained using method 600 (FIG. 6).

Embodiments described above illustrate but do not limit the invention. It should also be understood that numerous modifications and variations are possible in accordance with the principles of the present invention. Accordingly, the scope of the invention is defined only by the following claims.

What is claimed is:

1. An electronic device, comprising:
    a camera adapted to capture images, the camera comprising:
    a lens having a first focusing state and a second focusing state; and an image sensor adapted to capture a first image of an object in the first focusing state and a second image of the object in the second focusing state;

a memory configured to store instructions; and a processor coupled to the memory and the camera, wherein the processor, based on the instructions, is adapted to determine an object distance based on the first image and the second image; wherein the first focusing state forms an image in an image plane of the lens with the object at a first distance less than the object distance; and the second focusing state forms an image in an image plane of the lens with the object at a second distance greater than the object distance.

2. The electronic device of claim 1, comprising an actuator to place the lens in the first focusing state and the second focusing state.

3. The electronic device of claim 1, wherein the first image and the second image are not in an image plane of the lens.

4. The electronic device of claim 2, wherein the actuator places a lens in and out of an optical axis of the camera.

5. A lens system, comprising:

an actuator adapted to modify a configuration of the lens system;

a first configuration having a first focusing state;

a second configuration having a second focusing state;

a memory; and a lookup table stored in the memory, wherein the lookup table provides information to estimate a distance from the lens system to an object disposed within a distance range between the first and second focusing states based on image data of the object obtained at the first and second focusing states; wherein the actuator modifies the configuration of the lens system by placing a lens in an optical path of the lens system.

6. The lens system of claim 5, wherein the first focusing state maximizes a metric value for an object at a first position, and the second focusing state maximizes the metric value for an object at a second position.

7. A method, comprising:

capturing a first image of an object at an object distance using a first focusing state of a lens within a camera;

determining a first metric value for the first image;

capturing a second image of the object at approximately the object distance using a second focusing state of the lens;

determining a second metric value for the second image; and calculating a distance estimate between the camera and the object, for the first distance, based on calibration data and the first and second metric values using a first function of the object distance and a second function of the object distance, wherein the first function is maximized at a near distance and the second function is maximized at a far distance.

8. The method of claim 7, wherein the calculating comprises:

obtaining a ratio between the first metric value and the second metric value; and interpolating based on the ratio and the calibration data to determine the distance estimate between the camera and the object.

9. A method, comprising:

capturing a first image of an object at a first distance using a first focusing state of a lens within a camera;

determining a first metric value for the first image;

capturing a second image of the object at approximately the first distance using a second focusing state of the lens;

determining a second metric value for the second image;

obtaining a ratio between the first metric value and the second metric value;

interpolating based on the ratio and calibration data to determine a distance estimate between the camera and the object;

determining that the distance estimate between the camera and the object is closer than a near position if the ratio is less than a first threshold; and determining that the distance estimate between the camera and the object is greater than a far position if the ratio is greater than a second threshold.

10. The method of claim 9, wherein the determining the first metric value and the determining the second metric value comprise calculating an image metric by selecting a standard deviation over a plurality of pixels from an image sensor of the camera for the corresponding first and second images.

11. The method of claim 9, wherein the determining the first metric value and the determining the second metric value comprise determining absolute differences over a plurality of pixels from an image sensor of the camera for the corresponding first and second images.

12. The method of claim 9, wherein the determining the first metric value and the determining the second metric value comprise:

obtaining a filtered image by filtering with a kernel a desired frequency response over a plurality of pixels from an image sensor of the camera for the corresponding first and second images; and obtaining an energy value over the plurality of pixels in the filtered image for the corresponding first and second images.

13. The method of claim 12, wherein the kernel is symmetric.

14. The method of claim 9, wherein the calculating the distance estimate between the camera and the object comprises:

comparing the ratio to the calibration data stored in a lookup table.

15. A method, comprising:

providing a lens system having a first focusing state for an object at a first distance and a second focusing state for the object at a second distance;

providing a camera to capture images of the object with the lens system;

selecting a plurality of distances with values between the first distance and the second distance;

capturing with the camera a first image of the object at each one of the plurality of distances using the lens system in the first focusing state;

determining a first metric value for the first image of the object at each one of the plurality of distances;

capturing with the camera a second image of the object at each one of the plurality of distances using the lens system in the second focusing state;

determining a second metric value for the second image of the object at each one of the plurality of distances; and generating a distance estimate relationship to provide calibration data for the plurality of distances based on the object distance and values obtained from the first metric value determined at the object distance and the second metric value determined at the object distance for each one of the plurality of distances.

16. The method of claim 15, wherein the generating a distance estimate relationship comprises forming a lookup table, and wherein the method further comprises storing the lookup table for the lens system.

17. The method of claim 15, wherein the generating a distance estimate relationship comprises forming a distance estimate formula, and wherein the method further comprises storing the distance estimate formula for the lens system.

18. A computer-readable medium having non-transitory instructions for execution by a processor to perform a method for determining an object distance, the method comprising:

capturing a first image of an object at a distance using a first focusing state of a camera;

determining a first metric value from an image metric for the first image;

capturing a second image of the object at approximately the distance using a second focusing state of the camera;

determining a second metric value from the image metric for the second image; and calculating a distance estimate between the camera and the object based on the first and second metric values; the calculating further comprising:

assigning the first metric value to a first function of the object distance; and assigning the second metric value to a second function of the object distance;

wherein the first function has a maximum at a near distance and the second function has a maximum at a far distance.

19. The method of claim 18, wherein the calculating comprises:

calculating a ratio between the first metric value and the second metric value; and interpolating the ratio based on calibration data to determine the object distance.

20. The method of claim 19, wherein the calibration data is stored in a lookup table.

21. A computer-readable medium having non-transitory instructions for execution by a processor to perform a method for determining a depth map from an image, the method comprising:

selecting a first portion of the image including a first object at a first distance;

determining a first metric value from an image metric for the first portion of the image;

selecting a second portion of the image including a second object at a second distance;

determining a second metric value from the image metric for the second portion of the image; and calculating a relative distance estimate between the first object and the second object in the image based on the first and second metric values and a reference metric value.

22. The computer-readable medium of claim 21 wherein the reference metric value is obtained from at least one of the group consisting of:

a reference image portion; and a calibration data for a plurality of distances.

23. The computer-readable medium of claim 21 wherein the method further comprises rendering a 3D modeling of the image using the relative distance estimate between the first object and the second object.

* * * * *